United States Patent Office 3,344,123
Patented Sept. 26, 1967

3,344,123
CROSSLINKING POLYMERS WITH A HALO-
GENATED SULFUR COMPOUND
George E. Serniuk, Roselle, and John Rehner, Jr., and
Peter E. Wei, Westfield, N.J., assignors to Esso Research and Engineering Company, a corporation of Delaware
No Drawing. Filed Dec. 11, 1963, Ser. No. 329,900
17 Claims. (Cl. 260—79.3)

This application is a continuation-in-part of copending patent application Ser. No. 257,099, filed Feb. 8, 1963, now abandoned.

The present invention relates to halogenated sulfur compounds, a method of crosslinking polymers and to the cured polymers obtained. More particularly, the invention concerns the crosslinking of polymers made from alpha olefins with organic halogenated sulfur compounds.

Polymers prepared solely from alpha monoolefins are essentially saturated and do not have chemical functionality. Thus, it is not possible to vulcanize these polymers with conventional curing systems utilized for unsaturated and polar polymers.

It has now been discovered that difficult-to-cure, hydrocarbon polymers can be crosslinked with certain halogenated organic sulfur compounds containing: (1) at least one $S(O)_n$ function wherein $n$ is an integer of 1 to 2; (2) at least two essentially halogen substituted organic radicals. The halogenated organic sulfur compounds of the present invention are preferably used in conjunction with other conventional curing aids and/or an inorganic metal compound in which the metal moiety is a member of Groups II, III, IV or VIII of the Periodic Chart of Elements.

In one embodiment of the present invention, compounds that can be used to crosslink polymers in accordance with the invention are those having the general formula:

wherein "$n$" is 0 or 1, and R and R' are perhalogenated hydrocarbon or perhalogenated oxyhydrocarbon groups containing 1 to 20 carbon atoms. While the perhalogenated moieties can be alkyl, alkoxy, cycloalkyl, alkaryl, aryl, aroxy, alkyl sulfenyl or aryl sulfenyl groups, it is preferred to use compounds containing perhalogenated lower alkyl groups such as trichloromethyl and pentachloroethyl.

In another embodiment of the present invention, compounds having more than one sulfur group per molecule that can be used to crosslink polymers in accordance with the invention are those having the general formula:

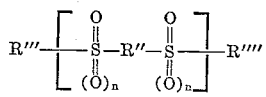

wherein "$n$" is 0 or 1, and R", R''', and R'''' are halogenated moieties corresponding to the moieties of R and R' described above. Best curing results are obtained when the values of R and R' and R", R''', and R'''' collectively do not contain more than one hydrogen atom.

Representative non-limiting examples of useful halogenated organic sulfonyl and sulfinyl compounds including compounds not represented by the above formulas that can be used alone or in combination to carry out the invention are bis(tribromomethyl)sulfone, bis(tribromomethyl)sulfoxide, bis(trichloromethyl)sulfoxide, pentachloroethyl trichloromethyl sulfoxide, trichloromethyl dichloromethyl sulfoxide, bis(trichloromethyl) sulfone, pentachloroethyl trichloromethyl sulfone, trichloromethyl dichloromethyl sulfone, 1,1,1-trichloro-2,2,2-tris(trichloromethyl sulfinyl) ethane, 1,1,1 - trichloro - 2,2,2-tris(trichloromethyl sulfonyl) ethane, 1,1,1,3,3,3 - hexachloro - 2,2 - bis(trichloromethyl sulfinyl) propane, 1,1,1,3,3,3 - hexachloro - 2,2 - bis(trichloromethyl sulfonyl) propane, bis(trichloromethyl) sulfinate, bis(trichloromethyl) sulfonate, bis(trichloromethyl) alpha disulfoxide, bis(trichloromethyl) alpha disulfone, pentachlorophenyl trichloromethyl sulfone, pentachlorophenyl trichloromethyl sulfoxide, bis(trifluoromethyl) sulfone, bis(trifluoromethyl) sulfoxide, bis(dichlorofluoromethyl) sulfone, bis(difluorochloromethyl) sulfone, bis(dichlorofluoromethyl) sulfoxide, bis(difluorochloromethyl) sulfoxide, pentafluoroethyl trifluoromethyl sulfone, bis(tribromomethyl) sulfoxide, chloromethylene-bis(trichloromethyl sulfone), chloromethylene-bis(tribromomethyl sulfone), bromomethylene-bis(tribromomethyl sulfone), bromomethylene-bis(trifluoromethyl sulfone), trichloroethylene-bis(pentachloroethyl sulfone), trichloroethylene-bis(tribromomethyl sulfone), dichloromethylene-bis(trichloromethyl sulfone), dibromomethylene-bis(trichloromethyl sulfone), tetrachloroethylene-bis(trifluoromethyl sulfone), and tetrachloroethylene-bis(pentabromoethyl sulfone).

Additionally, essentially halogen substituted polymers containing from about 3 to 11 sulfone groups per macromolecule of the formula type:

$$-SO_2X$$

wherein X is a perchlorinated or perbrominated lower alkyl group, can also be utilized as curing components in crosslinking hydrocarbon polymers.

Of the above compounds, the most useful are the bis (perhaloalkyl) sulfones, and more preferably the bis (perchloro $C_1$ to $C_3$ alkyl) sulfones such as bis(trichloromethyl) sulfone, i.e. $Cl_3CSO_2CCl_3$, sometimes called di (trichloromethyl) sulfone and the chloro alkylene bis (perchloro alkyl sulfones), and more preferably the chloro $C_1$ to $C_3$ alkylene bis(perchloro $C_1$ to $C_3$ alkyl sulfones) such as chloromethylene-bis(trichloromethyl sulfone), i.e. $Cl_3CSO_2CHClSO_2CCl_3$, and dichloromethylene-bis(trichloromethyl sulfone), i.e.

$Cl_3CSO_2CCl_2SO_2CCl_3$

To produce the desired halo alkylene bis(perhalo alkyl sulfones), formaldehyde and mercaptoacetic acid are reacted at temperatures ranging from 20 to 50° C. to obtain methylene-bis(thioglycolic acid). The reaction product is then contacted with sodium hypochlorite or sodium hypobromite to simultaneously oxidize and halogenate the intermediate material to form the desired halo alkylene bis(perhalo alkyl sulfones).

The bromine derivative of the above named compound is obtained when sodium hypobromite is utilized as the oxidation and halogenation agent. Fluorine derivatives are obtained by reacting a corresponding halogenated sulfide compound with antimony trifluoride in the presence of antimony pentafluoride at temperatures ranging from 25 to 95° C. for about 30 minutes. Fluorinated sulfones are then produced by oxidizing the compound using standard organic synthesis techniques. The preparation of bis (perhalo alkyl) sulfones is well known in the art.

As mentioned above, conventional curing adjuvants, such as sulfur, sulfur-bearing compounds which release sulfur under curing conditions, e.g. morpholine disulfide, tetraalkylthiuram disulfides, and alkylphenol mono and disulfides, as well as $C_5$ to $C_{10}$ perchlorinated alicyclic hydrocarbon compounds, especially octachlorocyclopentene, octachlorocyclopentane, bis(heptachlorocyclopentene) and other perchlorinated cyclopentene derivatives, can be employed in conjunction with the organic halogenated sulfur compounds. Sulfur is particularly effective.

Furthermore, the organic halogenated sulfur compounds of the present invention can be used in conjunction with conventional accelerators, e.g. zimates, etc.; halogen compounds such as trichloromelamine, hexachloromelamine, tetrachlorobenzoguanamine, bis(N - chloro) - p - benzoquinoneimine; hydrohalides of phenylene diamine, alkylated phenyl diamines, and aminophenols. In general, the amount of the aforementioned substances used in combination with the novel curing components will range from about 0.01 to 50 parts by weight per 100 parts by weight of polymer (php.), and preferably about 0.05 to 10 php.

It is also advantageous to use about 0.1 to 200 parts by weight php. and preferably about 1 to 10 php. of various metal compounds in conjunction with the organic halogenated sulfur compound. Among the metal compounds that can be used are halides, oxides, sulfides, and organic acid salts of metals in Group II, III, IV and VIII in the Periodic Chart of Elements shown on pages 56 and 57 of Lange's Handbook of Chemistry, 8th edition. Examples of suitable metal and non-metal compounds that may be employed in this invention are metal salts of organic carboxylic, sulfonic, and sulfinic acids, zinc oxide, calcium oxide, aluminum oxide, aluminum alkoxides, iron oxide, iron sulfide, barium oxide, zinc chloride, magnesium sulfide, lead oxides, silicon dioxide, titanium dioxide, magnesium oxide, antimony trioxide, and cadmium oxide. Of the foregoing, zinc oxide and magnesium oxide are especially useful. Two outstanding combinations of curing components are bis(perchloroalkyl) sulfone, sulfur and zinc oxide as well as chloro alkylene bis(perchloro alkyl sulfone), sulfur, and magnesium oxide.

A wide variety of inorganic fillers, including such things as carbon blacks, clays and whitings, may be used as desired in order to impart certain characteristics to the cured polymer. When fillers are used, it is generally best to employ reinforcing furnace blacks and channel blacks, such as HAF carbon black, SRF carbon black and EPC carbon black. The amount of filler used in compounding the polymer prior to vulcanization can vary from as little as 5 parts by weight php. to 200 parts by weight php. For most purposes, about 10 to 70 parts by weight of filler php. is used in conventionally loaded polymers.

Because some of the halogenated sulfur curing components of the present invention are mild lachrymators, e.g. bis(trichloromethyl) sulfone, it is advantageous for this and other reasons to premix the curing agent, either alone or with other conventional curing substances, such as sulfur, with a finely divided filler or pigment. For example, a part or all of the filler, such as carbon black or particulate clay, to be used in the polymer product can be premixed with the halogenated curing agent and the mixture is added to the polymer in the conventional manner. It is practical to use at least 1 part by weight of filler per part by weight of the halogenated curing component. For most purposes, it will be found that a premix comprising about 2 to 50 parts by weight of filler per part by weight halogenated curing component is efficacious. Of course, any other solid having a large surface area can be used in lieu of or in combination with the conventional fillers mentioned above.

In addition to the above-mentioned materials, other substances that are frequently admixed with curable solid polymers, including antioxidants, processing oils, plasticizers, waxes, and pigments, may be blended with the polymer prior to curing it in accordance with the present invention.

The amount of organic halogenated curing component or components used will depend to a large extent upon the characteristics of the polymer and the properties desired in the vulcanized product. In general, it will be found that a relatively small amount of the halogenated organic sulfur compound or compounds when used in accordance with this invention will produce vulcanizates having useful properties. While as little as 0.1 part by weight php. can be employed, it is generally necessary to use at least 0.5 part by weight php. in order to effect a degree of crosslinking to give good vulcanizate properties. For economic reasons, it is not practical to utilize more than about 20 parts by weight php. of the curing component; and, as a practical matter, it will be found that the best results are gotten with amounts of 1 to 10 parts by weight php.

In curing polymers, the organic halogenated sulfur compounds of this invention are thoroughly admixed with the polymer, which may be already compounded with fillers and chemicals having vulcanizing properties, such as sulfur, etc. The mixing may be effected either on a mill or in a Banbury mixer. The compounded polymer is then heated to an elevated temperature until the desired crosslink density is obtained. While crosslinkages will form over a long period of time, e.g. up to 8 hours, at relatively low temperatures, it is advisable to vulcanize at temperatures above 200° F. in order to keep the cure time to a minimum. The upper vulcanization temperature will be dictated mainly by the concentration of the curative, the contact or cure time and the effect of higher temperatures on the properties of the polymer. For most saturated hydrocarbon polymers, the vulcanization temperatures can, but need not, exceed 450° F. as in continuous vulcanizations with short contact times, or with plastics; and it is usually preferred to carry out the crosslinking step at temperatures between about 250° and 350° F. at pressures ranging from substantially atmospheric up to 250 p.s.i.g. for periods ranging from about 1 to 60 minutes.

The steam cures referred to in the examples below were effected in a jacketed autoclave 30 inches long and 24 inches in diameter. Steam is injected into the jacket and into the chamber to preheat the autoclave to the desired temperature and to supplant the air from the chamber. When the desired temperature is reached, the chamber is opened, the pads to be cured are inserted, the air in the chamber is then purged with steam and the autoclave is then sealed and steam pressure is adjusted to give the desired vulcanization temperature, e.g. 307° F.

The press cures were made at various temperatures for varying periods of time. A press temperature of 320° F. is quite convenient and was used in many of the examples below.

The press, which has a ram with a diameter of 15 inches, is conveniently operated at a ram pressure of 1500 p.s.i. which exerts a total pressure of 132.5 tons or 264,900 pounds which, when distributed on a square mold with an area of 256 sq. inches, amounts to a pressure of the mold on the polymer sample of 103.5 p.s.i.

While a wide variety of substantially saturated polymers may be cured in accordance with the present invention, the novel curing components have special application to substantially saturated hydrocarbon polymers made from alpha monoolefins containing 2 to 6 carbon atoms. The polyolefins may be highly crystalline in nature or they may be substantially amorphous. Because it has been particularly difficult to effectively crosslink copolymers of ethylene and higher alpha olefins, such as propylene, butene-1 and pentene-1, this process is particularly useful for these copolymers and their halogenated derivatives as well as such copolymers grafted with vinyl monomers.

Crystalline homopolymers of alpha olefins, e.g. ethylene and propylene, can be prepared in accordance with well known methods, such as described in Belgian Patents 533,362 and 538,782, as well as in Chemical and Engineering News, Apr. 8, 1957, pages 12–16. These linear polyolefins usually have a crystallinity of at least 20% and often have a crystallinity of 70% or higher. Their viscosity average molecular weights, using the Moraglio method referred to below, is in the range of 10,000 to 500,000 or higher. Their densities are usually between about 0.85 and 0.95.

The rubbery copolymers to which this invention has particular application can be prepared by interpolymerizing the olefin monomers in the presence of solid and liquid catalysts obtained by partially reducing a heavy metal compound, such as a halide of a metal selected from Groups IV–B, V–B, and VI–B of the Periodic Chart of Elements. Especially useful are vanadium tetrachloride, vanadium oxychloride and titanium trichloride. The metal halide, e.g. vanadium tetrachloride, is activated with an alkyl aluminum compound corresponding to the formula RR'AlX. In this formula, R, R' and X preferably are alkyl groups of 2 to 8 carbon atoms, although X may alternatively be hydrogen or halogen, notably chlorine. Representative of the aluminum alkyl compounds that can be used are aluminum triethyl, aluminum diethyl chloride, aluminum sesquichloride, aluminum triisobutyl, etc.

For example, ethylene and propylene are simultaneously contacted with vanadium tetrachloride and an activator such as aluminum triethyl in the presence of inert hydrocarbon solvents, e.g. isopentane, n-heptane or xylene, and the polymerization is conveniently effected at temperatures of about −20° to 212° F. and pressures ranging from about 0 to 500 p.s.i.g., usually 0 to 100 p.s.i.g. The catalyst concentration in the polymerization zone is preferably in the range of about 0.001% to 0.5% based on the total liquid, and the polymer product concentration in the polymerization zone is preferably kept between about 2 to 15% based on total contents, so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol, such as methanol, isopropyl alcohol or n-butyl alcohol, is normally added to the reaction mixture for the purpose of dissolving and deactivating the catalyst and, in some instances, to precipitate the polymer product from solution. After filtration, the solid polymer may be further washed with alcohol or acid such as hydrochloric acid and dried. Alternatively, the crude polymer product may be recovered flashing the diluent from the mixture.

Ethylene-propylene copolymers in general have average molecular weights of 25,000 to 1,000,000 as determined by viscosity measurements in tetralin solution, according to the method published by G. Moraglio, La Chimica e l'Industria, volume 41, page 984, 1959, and the amount of ethylene in the copolymers can range from 10 to 99 mole percent, but preferably from 30 to 85 mole percent or about 20 to 79 wt. percent. The copolymers are further characterized by the following properties: densities ranging from 0.85 to 0.90; percentage by weight insoluble in normal heptane at room temperature, ranging from 10% to 40% and in some instances up to 90%; and crystallinity content, as determined by X-ray diffraction, ranging from 0% to 15%. The exact values of these physical characteristics depend on the particular composition of the copolymer, and the conditions of synthesis and the catalyst used.

In addition to the saturated hydrocarbon polymers described above, other polymers which contain small amounts, e.g. 0.1 to 5 mole percent, of $C_8$ to $C_{10}$ unsaturated cyclic monomers, such as ethylene-propylene-dicyclopentadiene terpolymer, ethylene-propylene-methylene norbornene terpolymer, and ethylene-propylene-tetrahydroindene terpolymer can also be cured in accordance with the present invention, either alone or in admixture with the saturated polymers described above.

The vulcanized polymers prepared in accordance with the present invention may be used in a number of applications, including tires, wire coatings, pipe, footwear, channel stocks, as an undercoater for metals, and for other applications for which a stock with a high modulus, high tensile, a high tear strength, and a good ozone resistance is required. These products have a wide application because the vulcanizate is essentially odorless. Furthermore, when the cure is effected in the presence of a basic metal oxide, such as zinc oxide or magnesium oxide, the molds used in the curing operation are not stained or corroded.

The invention and its advantages will be better understood by reference to the following examples.

Example 1

An ethylene-propylene elastomer containing 42.5 wt. percent (52.5 mole percent) ethylene and the balance propylene having a heptane insolubility of 5.2%, a Mooney viscosity (8 minutes at 212° F.) of 38 and an inherent viscosity of 2.7 (0.5 mg./ml. in Decalin at 275° F.) was compounded on a rubber mill in accordance with the following recipe:

| Ingredients: | Parts by weight |
|---|---|
| Ethylene-propylene rubber | 100 |
| HAF carbon black | 50 |
| Bis(trichloromethyl)sulfone | 5 |
| $Fe_2O_3$ | 5 |
| Sulfur | 1 |

The resulting mixture was divided into two parts, and one part was cured at 320° F. for 20 minutes and the other part was cured at the same temperature for 40 minutes. The results are set forth in Table I.

TABLE I

| Property | 20 minute cure | 40 minute cure |
|---|---|---|
| Tensile strength at break, p.s.i. | 2,140 | 2,650 |
| Elongation, percent | 680 | 480 |
| 300% modulus, p.s.i. | 700 | 1,350 |
| Shore A hardness | 60 | 65 |

Example 2

The ethylene-propylene elastomer described in the above example was compounded on a rubber mill in accordance with the following recipe:

| Ingredients: | Parts by weight |
|---|---|
| Ethylene-propylene rubber | 100 |
| SRF carbon black | 200 |
| Neutral plasticizing hydrocarbon oil [1] | 100 |
| Bis(trichloromethyl) sulfone | 5 |
| $Fe_2O_3$ | 5 |
| Sulfur | 1 |

[1] Flexon–875:
| | |
|---|---|
| Sp. gr.—60/60 | 0.8805 |
| Saybolt viscosity in seconds at 100° F. | 438 |
| Saybolt viscosity in seconds at 210° F. | 61.2 |
| Flash, ° F. | 460 |
| Pour point, ° F. | +25 |
| Aromatics, wt. percent (silica gel) | 21 |

The highly loaded ethylene-propylene rubber was then cured by both the steam and press curing methods described above at 320° F. for 40 minutes. The results are shown in Table II.

TABLE II

| Properties | Steam Cured | Press Cured |
|---|---|---|
| Tensile strength, p.s.i. | 630 | 1,100 |
| Elongation, percent | 450 | 400 |
| 300% modulus, p.s.i. | 510 | 930 |
| Shore A | 55 | 65 |

Example 3

The ethylene-propylene elastomer described in Example 1 was compounded according to the following recipe and portions of the compounded rubber were press cured for different times at 320° F.

| Ingredients: | Parts by weight |
|---|---|
| Ethylene-propylene rubber | 100 |
| HAF black | 50 |
| Bis(trichloromethyl) sulfone | 5 |
| Zinc oxide | 5 |
| Sulfur | 1 |

The properties of the vulcanizate are set forth in Table III.

TABLE III

| Properties | 20 min. cure | 40 min. cure | 60 min. cure |
|---|---|---|---|
| Tensile strength, p.s.i. | 3,195 | 3,540 | 3,320 |
| Elongation, percent | 500 | 480 | 470 |

The above compounds showed good states of cure, particularly since the vulcanization was effected in the presence of a substantial amount of zinc oxide, which frequently has a deleterious action on chlorinated curatives. Because of the excellent compatibility with zinc oxide, the curing system of the present invention can be used to vulcanize polymers in a wide variety of molds without damaging the molds either by discoloration or corrosion.

*Example 4*

The ethylene-propylene rubber described in Example 1 was compounded with bis(trichloromethyl)sulfone premixed with carbon black. To 10 g. of di(trichloromethyl) sulfone were added 10 g. of HAF carbon black and the mixture was heated on a steam bath to melt the solid sulfone. The mixture was stirred until the liquefied sulfone was completely absorbed. The mixture was cooled and stirred until a free-flowing mix was obtained. To this mixture were then added 10 g. of HAF black with stirring. A uniform free-flowing mix resulted. This mixture was found to mix very rapidly into a masterbatch comprising 200 parts by weight ethylene-propylene rubber; 80 parts by weight HAF black; 10 parts by weight $Fe_2O_3$; and 2 parts by weight of sulfur. Pads were press cured at 320° F.

TABLE IV

| Properties | 20 min. cure | 40 min. cure | 60 min. cure |
|---|---|---|---|
| 300% Modulus, p.s.i. | 750 | 1,500 | 1,875 |
| Tensile Strength, p.s.i. | 2,375 | 2,850 | 2,850 |
| Elongation, percent | 600 | 450 | 400 |

*Examples 5–12*

Polyethylene, having an inherent viscosity in Decalin at 275° F. of 2.50, a melt index of 1.2 and a density of 0.9476, and isotactic polypropylene, having an inherent viscosity of 3.08 were compounded and cured as shown in the following table:

The data presented in Table V show that di(trichloromethyl)sulfone, in conjunction with sulfur and zinc oxide, can crosslink polyethylene as indicated by the high gel content of the specimen. These data also show that polyethylene, which is compounded with a carbon black, is also crosslinked by this combination of curing agents. As demonstrated by the data, zinc oxide can be replaced with ferric oxide. Polypropylene is also crosslinked by di(trichloromethyl)sulfone in conjunction with sulfur and a metal compound. The degree of crosslinking is greater with ferric oxide than it is with zinc oxide.

*Example 13*

A masterbatch was prepared as follows:

| Component: | Parts by weight |
|---|---|
| Ethylene-propylene-methylene norbornene terpolymer [2] | 100 |
| HAF carbon black | 50 |
| Sulfur | 1 |

[2] Characteristics of terpolymer:
Mooney viscosity at 260° F. _____ 75
Inherent viscosity in Decalin at 275° F. _____ 2.9
Ethylene, wt. percent _____ 58
Methylene norbornene, wt. percent _____ 3.4
Propylene, wt. percent _____ 38.6

The masterbatch was split into three parts and to one part there were added 5 php. of ZnO, to another part there were added 5 php. of di(tribromomethyl)sulfoxide, and to the remaining part were added 5 php. of ZnO and 5 php. of di(tribromomethyl) sulfoxide. The compounds were cured for various times at 320° F. The following results were obtained.

| Cure Time, Minutes | Property | Components Present in Masterbatch | | |
|---|---|---|---|---|
| | | ZnO | Di(Tribromomethyl) Sulfoxide | ZnO and Di(Tribromomethyl) Sulfoxide |
| 20 | $T_B$, p.s.i. | 190 | 2,580 | 1,890 |
|    | E, percent   | 250 | 400   | 125   |
| 40 | $T_B$, p.s.i. | 495 | 2,720 | 1,980 |
|    | E, percent   | 650 | 375   | 125   |
| 60 | $T_B$, p.s.i. | 540 | 2,590 | 2,860 |
|    | E, percent   | 675 | 350   | 150   |

The data show that di(tribromomethyl)sulfoxide, in conjunction with sulfur and/or a metal compound, is an effective crosslinking agent for unsaturated ethylene-propylene terpolymers.

*Example 14*

A masterbatch was prepared as follows:

| Components: | Parts by weight |
|---|---|
| Ethylene-propylene-methylene norbornene terpolymer [3] | 100 |
| HAF black | 50 |
| Sulfur | 1 |

[3] Characteristics of terpolymer:
Mooney viscosity at 260° F. _____ 75
Inherent viscosity in Decalin at 275° F. _____ 2.9
Ethylene, wt. percent _____ 58
Methylene norbornene, wt. percent _____ 3.4
Propylene, wt. percent _____ 38.6

TABLE V

| Example No. | 5 | 6 | 7 | 8 | 9 | 10 | 11 | 12 | Controls | | | |
|---|---|---|---|---|---|---|---|---|---|---|---|---|
| Polyethylene | 100 | 100 | 100 | 100 | | | | | 100 | 100 | | |
| Polypropylene | | | | | 100 | 100 | 100 | 100 | | | 100 | 100 |
| HAF Black | 0 | 50 | 0 | 0 | 0 | 50 | 0 | 0 | 0 | 50 | 0 | 50 |
| Sulfur | 1 | 1 | 1 | 1 | 1 | 1 | 1 | 1 | 1 | 1 | 1 | 1 |
| ZnO | 5 | 5 | 0 | 0 | 5 | 5 | 0 | 0 | 0 | 0 | 0 | 0 |
| $Fe_2O_3$ | 0 | 0 | 5 | 5 | 0 | 0 | 5 | 5 | 5 | 5 | 5 | 5 |
| Di(Trichloromethyl) Sulfone | 5 | 5 | 5 | 2.5 | 5 | 5 | 5 | 2.5 | 0 | 0 | 0 | 0 |
| Cure Temp., °F | 400 | 400 | 400 | 400 | 400 | 400 | 400 | 400 | 400 | 400 | 400 | 400 |
| Cure Time, Minutes | 6 | 6 | 6 | 6 | 6 | 6 | 6 | 6 | 6 | 6 | 6 | 6 |
| Polymer, Weight Percent Gel [a] | 98.8 | 84.1 | 97.7 | 69.8 | 10.6 | 50.2 | 75.2 | 58.8 | 1.6 | 32.6 | 1.6 | 32.0 |

[a] Percent of product which is insoluble in Decalin at 275° F. (1 g. of vulcanizate/liter).

The masterbatch was split into two parts, one of which was compounded with 5 php. of ZnO, and the other part was compounded with 5 php. of ZnO, and 5 php. of di(trichloromethyl) sulfone. The compounds were cured for various times at 320° F. The following results were obtained:

| Cure Time, Minutes | Property | Components Present in Masterbatch | |
|---|---|---|---|
| | | ZnO | ZnO and Di(Trichloromethyl) Sulfone |
| 20 | TB, p.s.i. | 190 | 4,090 |
| | E, percent | 250 | 200 |
| 40 | TB, p.s.i. | 495 | 3,700 |
| | E, percent | 650 | 200 |
| 60 | TB, p.s.i. | 540 | 3,325 |
| | E, percent | 675 | 175 |

*Example 15*

Ethylene-propylene rubber having an inherent viscosity of about 2.7 and containing 42.5 wt. percent ethylene was compounded as follows:

Component: Parts by weight
    Ethylene-propylene rubber _____ 100
    HAF carbon black _____ 50
    $Fe_2O_3$ _____ 5
    Sulfur _____ 1
    Octachlorocyclopentene _____ 2.5
    Bis(trichloromethyl)sulfone _____ 2.5

When press cured at 320° F. for 20 minutes, the compounded rubber had a tensile strength of 1470 p.s.i. at break and an elongation of 600%. When no sulfone was used in the same recipe, the tensile strength was only 915 p.s.i. at break.

*Example 16*

Into a glass reaction flask was charged 6.55 grams of paraformaldehyde and 100 ml. of concentrated hydrochloric acid. The mixture was heated on a steam bath to a temperature of about 40 to 45° C. then held at this temperature until a clear solution was obtained. The solution was cooled to a temperature of about 20° C., stirred, and a solution of 20 grams of mercaptoacetic acid was added at a slow rate. After all the mercaptoacetic acid was introduced into the reaction zone, the reaction mixture was allowed to stand and, when cool, crystals began to separate. The crystalline, crude product, recovered by filtration, amounted to 25 grams and melted at 124° C.

A sodium hypochlorite solution was prepared by introducing 71 grams of chlorine to an ice cold solution of 82 grams of sodium hydroxide in 600 mls. of water. The solution was buffered by the addition of 15 grams of sodium bicarbonate. To the stirred, ice cold hypochlorite solution were added 18 grams of the above mentioned crystalline intermediate product at a slow rate. During the course of this addition the reaction temperature was held at a temperature in the range of from about −5 to 20° C. When the addition of the intermediate product was complete, the reaction mixture was removed from the cooling bath and was stirred for 30 minutes at room temperature. The supernatant liquid was decanted and the product was collected on a filter, washed with water and dried. The dried reaction product was then contacted with cool pentane and resulted in the resolution of the reaction product into a fraction which was extremely soluble in pentane which was labeled as product 1, and a fraction that was not soluble in cool pentane which was identified as product 2. Product 1, after being isolated from the pentane by crystallization, was a solid which melted at 34.5° C. Product 2, after recrystallization from chloroform, exhibited a melting point of 116° C.

Product 2 was then subjected to an elemental analysis and was found to contain 8.35 wt. percent carbon; 0.3 wt. percent hydrogen; 13.9 wt. percent oxygen; 63.0 wt. percent chlorine; and 14.4 wt. percent sulfur. The molecular weight of product 2 as determined by a cryoscopic method, was found to be 453. The above analysis and molecular weight indicate the product to be dichloromethylene-bis(trichloromethyl sulfone). When methylene bis(mercaptoacetic acid) was prepared in the presence of benzene and halogenated and oxidized by a similar procedure, but at a reaction temperature of 20 to 35° C., a product was obtained which on extraction with hexane yielded a fraction, a white solid, which showed the following analysis: C, 8.89%; H, 0.72%; O, 14.88%; Cl, 59.30%; and sulfur, 14.39%. The molecular weight of this product was found to be 419 by a cryoscopic method. The elemental analysis and molecular weight indicate the product to be chloromethylene-bis(trichloromethyl sulfone).

*Example 17*

Polypropylene having an inherent viscosity in Decalin at 275° F. of 2.0, a melt index of 10.5 at 230° C., and a density of 0.905, was compounded and cured as shown in the following table. In each run the compounded material was press cured at a temperature of 320° F. for a period of 5 minutes.

TABLE IX

| Run No | 1 | 2 | 3 |
|---|---|---|---|
| Polypropylene | 100 | 100 | 100 |
| MgO | 10 | 10 | |
| Sulfur | 1.55 | 1.55 | |
| Dichloromethylene-bis (Trichloromethyl Sulfone) | | 5 | |
| Tensile Strength, p.s.i. | 4,225 | 4,715 | 4,500 |
| Percent Elongation at Break | 20.8 | 21.7 | 16.0 |
| Weight Percent Gel [a] | 7.1 | 17.3 | None |

[a] Percent of product which is insoluble in Decalin at 275° F. (1 g. of vulcanizate/liter).

As is indicated by the data set forth above, the use of dichloromethylene-bis(trichloromethyl sulfone) in combination with magnesium oxide and sulfur serves to crosslink polypropylene as is indicated by the gel content of the specimen of run number two. As demonstrated by runs 2 and 3, the fact that the polypropylene was crosslinked to an appreciable extent is indicated by an increase in tensile strength over the uncured polypropylene of run three.

*Example 18*

Polyethylene, having a melt index of 3.7 at 190° C., and a density of 0.923, was compounded and press cured as shown in the following table. The desired crosslinked polymer was obtained by curing at a temperature of 320° C. for a period of about 20 minutes.

TABLE X

| Run No | 1 | 2 | 3 |
|---|---|---|---|
| Polyethylene | 100 | 100 | 100 |
| MgO | 10 | 10 | |
| Sulfur | 1.55 | | |
| Dichloromethylene-bis (Trichloromethyl Sulfone) | | 5 | |
| Tensile Strength, p.s.i. | 1,645 | 1,685 | 1,580 |
| Percent Elongation at Break | 17.6 | 16.0 | 19.7 |

The data set forth in Table X above indicates than an increase in tensile strength of the polyethylene specimens is achieved with the use of a halogenated sulfur compound of the present invention.

*Example 19*

Several runs were conducted to determined the effect of various types of metal oxides on the curing properties of ethylene-propylene rubber. Ten parts by weight of the metal oxide, 50 parts by weight of Philblack-O (a fine carbon black), 1.55 parts by weight of sulfur, and 5 parts by weight of dichloromethylene-bis(trichloromethyl sulfone) were compounded with 100 parts by weight of ethylene-propylene rubber on a rubber mill. The ethylene-propylene elastomer contained 45.9 wt. percent ethylene and the balance propylene, had a heptane insolubility of 10.2%, a Mooney viscosity (8 minutes at 212° F.) of 44 and an inherent viscosity of 3.2 (0.5 mgs. per ml. in Decalin at 275° F.). The resulting mixtures were press cured at varying temperatures for a period of 20 minutes. The results are set forth in the table below.

TABLE XI

| Metal Oxide | Run No. | | | | | | Cure Temp. (° F.) |
| --- | --- | --- | --- | --- | --- | --- | --- |
| | 1 | 2 | 3 | 4 | 5 | 6 | |
| | BaO₂ | PbO | TiO₂ | Sb₂O₃ | MgO | ZnO | |
| 300% Modulus (p.s.i.) | 1,540 | 1,605 | | 1,645 | 940 | 795 | 212 |
| Tensile Strength (p.s.i.) | 1,540 | 1,745 | 815 | 1,645 | 1,410 | 1,455 | 212 |
| Percent Elongation at Break | 300 | 310 | 210 | 300 | 485 | 510 | 212 |
| 300% Modulus (p.s.i.) | 1,755 | | 1,135 | 1,975 | 1,182 | 1,032 | 250 |
| Tensile Strength (p.s.i.) | 1,755 | 1,460 | 1,530 | 1,975 | 2,055 | 1,615 | 250 |
| Percent Elongation | 300 | 225 | 410 | 300 | 450 | 415 | 250 |
| 300% Modulus (p.s.i.) | 1,370 | 2,560 | 1,395 | 1,510 | 1,770 | 1,375 | 280 |
| Tensile Strength (p.s.i.) | 2,065 | 3,045 | 1,780 | 2,275 | 2,400 | 2,350 | 280 |
| Percent Elongation | 415 | 365 | 385 | 415 | 385 | 435 | 280 |
| 300% Modulus (p.s.i.) | 1,105 | 2,765 | 1,645 | 1,865 | 2,180 | 2,000 | 307 |
| Tensile Strength (p.s.i.) | 1,655 | 2,735 | 2,540 | 1,860 | 2,475 | 2,660 | 307 |
| Percent Elongation | 390 | 300 | 435 | 285 | 325 | 400 | 307 |
| 300% Modulus (p.s.i.) | 1,705 | 3,205 | 1,870 | 2,760 | 2,050 | 2,090 | 320 |
| Tensile Strength (p.s.i.) | 2,640 | 3,595 | 2,260 | 2,760 | 3,030 | 2,540 | 320 |
| Percent Elongation | 435 | 335 | 315 | 300 | 400 | 360 | 320 |

The data presented in the table above indicates that dichloromethylene-bis(trichloromethyl sulfone), in conjunction with sulfur and various types of metallic oxides, can crosslink ethylene-propylene rubber as indicated by the modulus and high tensile strength of the specimens. The data also illustrate that lead oxide gives vulcanizates with good properties at cure temperatures as low as 212° F. Magnesium oxide and zinc oxide, in addition to giving vulcanizates having highly desirable properties also serve to reduce the shrinkage of the micropad specimen during the vulcanization process. A small degree of shrinkage occurred when barium oxide, lead oxide, titanium dioxide, and antimony trioxide were utilized.

Example 20

An ethylene/propylene/5-methylene-2-norbornene terpolymer containing 49.6 wt. percent ethylene, 49.6 wt. percent propylene and the balance 5-methylene-2-norbornene having a Mooney viscosity at 260° F. of 83 was compounded with varying amounts of semi-reinforcing black and Flexon–846 (a neutral plasticizing hydrocarbon oil) and subjected to a peroxide cure and a cure utilizing the agents of the present invention. The peroxide curing agent used was Lucidol–230 XL, manufactured by the Lucidol Division of Wallace and Tiernan Inc. Flexon–846 has a flash point of 405° F., a pour point of +15° F., a Saybolt Viscosity in seconds at 100° F. of 145 and a Saybolt Viscosity in seconds at 210° F. of 43. The compounded material was then press cured at a temperature of 320° F. for varying periods of time. The results are illustrated in the table below:

TABLE XII

| Run No. | 1 | 2 | 3 | 4 | 5 | 6 |
| --- | --- | --- | --- | --- | --- | --- |
| Terpolymer | 100 | 100 | 100 | 100 | 100 | 100 |
| SRF Black | 60 | 140 | 200 | 60 | 140 | 200 |
| Flexon–846 | 0 | 50 | 100 | 0 | 50 | 100 |
| Sulfur | 0.3 | 0.3 | 0.3 | 1.55 | 1.55 | 1.55 |
| ZnO | | | | 5 | 5 | 5 |
| Chloromethylene-bis (Trichloromethyl Sulfone) | | | | 5 | 5 | 5 |
| Lucidol–230 XL | 5 | 5 | 5 | | | |
| Cure Time (Min.) | 20 | 20 | 20 | 20 | 20 | 20 |
| 300% Modulus (p.s.i.) | | 1,300 | 370 | | | |
| Tensile Strength (p.s.i.) | 2,800 | 1,300 | 370 | 2,725 | 2,685 | 1,415 |
| Percent Elongation | 265 | 300 | 340 | 185 | 175 | 190 |
| Cure Time (Min.) | 40 | 40 | 40 | 40 | 40 | 40 |
| 300% Modulus (p.s.i.) | | 1,335 | 310 | | | |
| Tensile Strength (p.s.i.) | 2,840 | 1,335 | 330 | 2,775 | 2,545 | 1,390 |
| Percent Elongation | 265 | 300 | 350 | 200 | 165 | 225 |
| Cure Time (Min.) | 60 | 60 | 60 | 60 | 60 | 60 |
| 300% Modulus (p.s.i.) | | 1,355 | 315 | | | |
| Tensile Strength (p.s.i.) | 2,825 | 1,370 | 345 | 2,360 | 2,790 | 1,430 |
| Percent Elongation | 265 | 310 | 400 | 165 | 175 | 190 |

The data presented in Table XII illustrate that the chloromethylene-bis(trichloromethyl sulfone), sulfur, and zinc oxide curing system is markedly superior to a peroxide cure in curing terpolymers that are highly loaded with carbon black and oil. Runs 2 and 5 illustrate that the curing system of the present invention gives vulcanizates that have tensile strengths that are roughly twice of that obtained using conventional peroxide curing systems at moderate levels of carbon black loadings and oil loading. Runs 3 and 6 indicate that the vulcanizate obtained with the curing system of the present invention at very high levels of oil and black loading gave vulcanizates that are roughly 3 to 4 times superior to that obtained with a conventional peroxide curing system. In addition to the superior vulcanizates obtained, chloromethylene-bis(dichloromethyl sulfone) and dichloromethylene-bis(trichloromethyl sulfone) are relatively nonvolatile and do not present odor problems as are experienced with the use of peroxide cures.

Example 21

Essentially halogen substituted polymeric materials having from 3 to 11 perhalogenated lower alkyl sulfone groups per macromolecule are prepared by the following process. Into a glass reaction vessel equipped with a stirrer, reflux condenser, and gas inlet and outlet tubes is charged 5 grams of finely divided sodium in 900 grams of normal heptane and 100 grams of dioxane. The reaction vessel and its contents are heated to a temperature of about 176° F. and 120 grams of gaseous butadiene is added continuously to the reaction zone. Heating is continued until the polymerization reaction is substantially complete. Following completion of the reaction, sufficient acetic acid is added to the reaction zone to convert unreacted sodium to sodium acetate. The reaction liquid is then washed with water to remove the sodium acetate and the resulting liquid is stripped under a nitrogen atmosphere until the heptane and dioxane is removed. About 120 grams of a light colored liquid polybutadiene having a molecular weight of about 600 as determined by an ebulloscopic method is obtained as a residue. The iodine number of the polybutadiene is about 420 as determined by the WIJS method.

One hundred grams of the above polymer is then dissolved in 500 cc. of a solvent consisting of 75 volume percent benzene and 25 volume percent isopropyl alcohol. A solution consisting of 0.5 gram of benzoyl peroxide in 10 cc. of benzene is then added to the polymer solution. The reaction vessel is then blanketed with nitrogen and 340 grams of mercaptoacetic acid is added to the reaction zone and the mixture refluxed for 24 hours. Following the completion of the reaction period, the solvent and excess mercaptoacetic acid are stripped from the polybutadiene-mercaptoacetic acid adduct by heating under a vacuum of 10 mm. of mercury. Sulfur analysis of the above product indicates that there are nine-$SCH_2COOH$ groups per mole of adduct.

One hundred grams of the above adduct are added to a sufficient quantity of one normal sodium hydroxide to dissolve the adduct. A solution consisting of 740 grams of sodium hypochlorite and 90 grams of sodium bicarbonate dissolved in 6 liters of water is then added to the adduct solution at such a rate that the reaction temperature does not exceed about 113° F. The reaction product separates from the water phase during reaction and is collected by decantation and is subsequently dissolved in carbon tetrachloride. To the carbon tetrachloride solution is then added 700 grams of sulfuric oxychloride. The mixture is then refluxed until the evolution of hydrogen chloride and sulfur dioxide has essentially ceased. The final product is recovered by distilling off the carbon tetrachloride and residual sulfuric oxychloride. Product yield is essentially quantitative. Sulfur and chlorine analysis indicate that the product is of essentially the following composition: $C_{44}Cl_{65}H \cdot (SO_2CCl_3)$. The product is suitable for use as a curing component in the crosslinking of essentially saturated hydrocarbon polymers.

It is not intended to restrict the present invention to the foregoing examples which are given merely to demonstrate some of the embodiments of the invention. It should only be limited by the appended claims in which it is maintained to claim all the novelty inherent in the invention, as well as all the modifications and equivalence coming within the scope and sphere of the invention.

What is claimed is:

1. A method of crosslinking a hydrocarbon polymer containing a substantial number of alpha olefin units which comprises mixing said polymer with a halogenated sulfur compound having the general formula selected from the group consisting of:

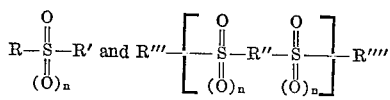

wherein "n" is 0 or 1, and R, R', R", R''' and R'''' are selected from the group consisting of perhalogenated hydrocarbon and perhalogenated oxyhydrocarbon groups having from 1 to 20 carbon atoms and heating the mixture until crosslinks are formed in the polymer.

2. The method of claim 1 in which the halogenated sulfur compound contains not more than one hydrogen atom per molecule.

3. The method of claim 1 in which the hydrocarbon polymer is substantially saturated.

4. The method of claim 1 wherein the polymer is mixed with the halogenated sulfur compound and a conventional curing aid prior to heating.

5. The method of claim 4 wherein R, R', R", R''' and R'''' are perhalogenated lower alkyl groups.

6. The method of claim 5 wherein said perhalogenated lower alkyl groups contain from 1 to 3 carbon atoms.

7. The method of claim 6 wherein said halogenated sulfur compound has the formula:

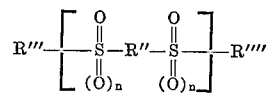

8. A method of crosslinking a hydrocarbon polymer containing a substantial number of alpha olefin monomer units which comprises mixing said polymer with a conventional curing aid and a halogenated sulfur compound selected from the group consisting of bis(trichloromethyl)-sulfone, chloromethylene-bis(trichloromethyl sulfone), and dichloromethylene-bis(trichloromethyl sulfone), and heating the mixture until crosslinks are formed in the polymer.

9. The method of claim 8 in which a metal oxide is also mixed with the polymer prior to heating the mixture.

10. A method of crosslinking a homopolymer of a $C_2$ to $C_3$ alpha olefin which comprises mixing said homopolymer with small amounts of sulfur and a compound selected from the group consisting of bis(trichloromethyl) sulfone, chloromethylene-bis(trichloromethyl sulfone), and dichloromethylene-bis(trichloromethyl sulfone) and heating the resulting mixture until the homopolymer contains crosslinks.

11. The composition comprising a hydrocarbon polymer containing a substantial number of alpha olefin units and a halogenated sulfur compound having the general formula selected from the group consisting of:

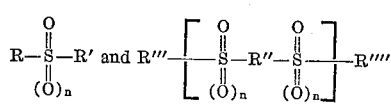

wherein "n" is 0 or 1 and R, R', R", R''', and R'''' are selected from the group consisting of perhalogenated hydrocarbon and perhalogenated oxyhydrocarbon groups having from 1 to 20 carbon atoms.

12. The composition of claim 11 wherein R, R', R", R''', and R'''' are perhalogenated lower alkyl groups having from 1 to 3 carbon atoms.

13. The composition of claim 12 wherein the halogenated sulfur compound has the general formula:

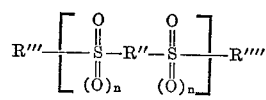

14. The composition of claim 11 in which the polymer is ethylene-propylene rubber and the composition contains sulfur.

15. The composition of claim 11 in which the polymer is a homopolymer of $C_2$ to $C_3$ alpha olefin and the composition contains sulfur.

16. The composition of claim 11 in which the compound contains not more than one hydrogen atom per molecule.

17. A composition comprising ethylene-propylene rubber and 0.1 to 20 parts by weight of a compound selected from the group consisting of bis(trichloromethyl)sulfone, chloromethylene-bis(trichloromethyl sulfone), and dichloromethylene-bis(trichloromethyl sulfone) per 100 parts by weight of said rubber.

References Cited

UNITED STATES PATENTS 2,628,982  2/1953  James _____ 260—607
3,258,447  6/1966  Matteucci et al. _____ 260—79.5

OTHER REFERENCES

Wei et al.: Rubber Chemistry and Technology, vol. 35, January–June 1962, pages 133–140.

JOSEPH L. SCHOFER, *Primary Examiner.*

D. K. DENENBERG, *Assistant Examiner.*